US009425876B2

United States Patent
Yu et al.

(10) Patent No.: US 9,425,876 B2
(45) Date of Patent: Aug. 23, 2016

(54) APPARATUS AND METHOD FOR CHANNEL FEEDBACK IN MULTIPLE INPUT MULTIPLE OUTPUT SYSTEM

(71) Applicants: Samsung Electronics Co., Ltd., Suwon-si, Gyeonggi-do (KR); INDUSTRY-ACADEMIC COOPERATION FOUNDATION, YONSEI UNIVERSITY, Seoul (KR)

(72) Inventors: Hyoung-Youl Yu, Seoul (KR); Chan-Byoung Chae, Gwacheon-si (KR); Yeon-Geun Lim, Pohang-si (KR); Min Soo Sim, Seoul (KR); Young-Woo Kwak, Suwon-si (KR); Hyo-Jin Lee, Suwon-si (KR); Hyoung-Ju Ji, Seoul (KR); Youn-Sun Kim, Seongnam-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 14/641,964

(22) Filed: Mar. 9, 2015

(65) Prior Publication Data
US 2015/0256244 A1 Sep. 10, 2015

(30) Foreign Application Priority Data
Mar. 7, 2014 (KR) .......................... 10-2014-0027295

(51) Int. Cl.
*H04B 7/02* (2006.01)
*H04L 1/02* (2006.01)
*H04B 7/04* (2006.01)
*H04B 7/06* (2006.01)

(52) U.S. Cl.
CPC .......... *H04B 7/0478* (2013.01); *H04B 7/0413* (2013.01); *H04B 7/0617* (2013.01); *H04B 7/0619* (2013.01); *H04B 7/0639* (2013.01)

(58) Field of Classification Search
CPC .............................. H04L 1/0618; H04L 1/06
See application file for complete search history.

(56) References Cited

U.S. PATENT DOCUMENTS

| | | | |
|---|---|---|---|
| 2011/0248889 A1* | 10/2011 | Lindgren ............. | H04B 7/0417 342/373 |
| 2013/0315337 A1 | 11/2013 | Dai et al. | |
| 2014/0181171 A1* | 6/2014 | Dourbal ................. | G06F 17/16 708/607 |
| 2015/0287223 A1* | 10/2015 | Bresler ................ | G06T 11/006 382/131 |

* cited by examiner

*Primary Examiner* — Shuwang Liu
*Assistant Examiner* — Gina McKie
(74) *Attorney, Agent, or Firm* — Jefferson IP Law, LLP (57) ABSTRACT

An apparatus and a method for feeding a channel back in a wireless communication system using multiple input multiple output antennas (MIMO) are provided. The method includes receiving a signal from a transmitter and configuring a channel matrix for the received signal, configuring a basis transformed sparse channel using a sparsifying basis function with respect to the channel matrix, selecting a channel part to be fed back to the transmitter from the transformed sparse channel, and creating a codebook by quantizing the selected channel part, and feeding a codebook index corresponding to the created codebook back to the transmitter.

15 Claims, 8 Drawing Sheets

APPARATUS AND METHOD FOR CHANNEL FEEDBACK IN MULTIPLE INPUT MULTIPLE OUTPUT SYSTEM

CROSS-REFERENCE TO RELATED APPLICATION(S)

This application claims the benefit under 35 U.S.C. §119 (a) of a Korean patent application filed on Mar. 7, 2014 in the Korean Intellectual Property Office and assigned Serial number 10-2014-0027295, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) INDUSTRY-ACADEMIC COOPERATION FOUNDATION, YONSEI UNIVERSITY

TECHNICAL FIELD

The present disclosure relates to an apparatus and a method for feeding a channel back in a wireless communication system using multiple input multiple output (hereinafter, referred to as "MIMO") antennas. More particularly, the present disclosure relates to a method of channel feedback, which reduces overhead of channel feedback and lowers complexity in a multi-antenna system that has a relatively high space correlation.

BACKGROUND

To meet the demand for wireless data traffic having increased since deployment of 4G (4th-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, a multiple input multiple output (MIMO) system that utilizes resources of a space area in order to transmit high quality data at a high speed in a wireless communication environment has been widely researched. More particularly, the technology of massive MIMO that adopts dozens to hundreds of antennas in a base station draws attention. The massive MIMO system adopts signal transmission devices, for example, a multitude of antennas installed in a base station (BS), and easily copes with various issues, such as fast fading, and inter-user interferences using only a simple linear pre-coder, in order to thereby obtain a high data rate. The massive MIMO system is not limited to the number of antennas supported by the base station, and it is based on that the base station thereof knows the channel information of every antenna supported by the base station. The MIMO system may be divided into a single-user (SU) MIMO type in which a single user uses all of the same time and frequency resource, and a multi-user (MU) MIMO type in which a plurality of users shares the same time and frequency resource through space multiplexing.

With regard to the SU-MIMO type, a method by which the principal singular vector of a channel is quantized to be transmitted for channel feedback, like the Grassmanian code book, has been developed and discussed in various organizations for standardization, such as Institute of Electrical and Electronics Engineers (IEEE) 802.16.

Since cooperation between users cannot be made in the MU-MIMO type, interferences between receivers (users) should be removed or attenuated only by a pre-coder that is used in the base station. In addition, each receiver should feed channel information back to the base station so that the base station creates the pre-coder for multiple users. The MU-MIMO type adopts an explicit feedback method in which the channel information is directly transmitted, and an implicit feedback method by which the receiver selects a pre-coding matrix indicator (PMI) to be transmitted to the base station.

Typical technologies of channel feedback are limited to the number of antennas and designed for a system that has a relatively low channel space correlation. However, in the case of the massive MIMO system, dozens to hundreds of antennas should be installed in the limited space, so the space correlation thereof may be higher than that of a typical system. In addition, the feedback method of transmitting the PMI from the receiver to the base station is not suitable for the massive MIMO environment that has a high space correlation.

Therefore, a need exists for an apparatus and a method of channel feedback, which reduces overhead of channel feedback and lowers complexity in a multi-antenna system that has a relatively high space correlation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method of channel feedback, which reduces overhead of channel feedback and lowers complexity in a multi-antenna system that has a relatively high space correlation.

Another aspect of the present disclosure is to provide an apparatus and a method of channel feedback, which effectively compresses a high-dimensional channel matrix due to multiple antennas and feeds a compressed channel codebook back to the transmitter.

Another aspect of the present disclosure is to provide an apparatus and a method of channel feedback in a multiple input multiple output system to maximize performance of a single/multi-user massive MIMO system.

In accordance with an aspect of the present disclosure, a method for feeding a channel back to a transmitter from a receiver in a multiple input multiple output (MIMO) system is provided. The method includes receiving a signal from the transmitter and configuring a channel matrix for the received signal, configuring a basis transformed sparse channel using a sparsifying basis function with respect to the channel matrix, selecting a channel part to be fed back to the transmitter from the transformed sparse channel, and creating a codebook by quantizing the selected channel part, and feeding a codebook index corresponding to the created codebook back to the transmitter.

In accordance with another aspect of the present disclosure, an apparatus for feeding a channel back to a transmitter in a MIMO system is provided. The apparatus includes a channel estimator configured to receive a signal from the transmitter and to configure a channel matrix for the received signal, a basis transformer configured to configure a basis transformed sparse channel using a sparsifying basis function with respect to the channel matrix, a channel dimension reducer configured to select a channel part to be fed back to the transmitter from the transformed sparse channel, and a channel quantizer configured to create a codebook by quantizing the selected channel part, and to feed a codebook index corresponding to the created codebook back to the transmitter.

In accordance with another aspect of the present disclosure, a method for receiving channel feedback by a transmitter from a receiver in a MIMO system is provided. The method includes receiving a codebook index from a receiver, selecting a channel vector using the codebook index and a codebook, restoring the dimension of the selected channel vector, and performing basis inverse transformation with the same sparsifying basis function as that applied in the receiver to restore the channel.

In accordance with another aspect of the present disclosure, an apparatus for receiving channel feedback by from a receiver in a MIMO system is provided. The apparatus includes a codebook channel restorer configured to receive a codebook index from a receiver and to select a channel vector using the codebook index and a codebook, a channel dimension restorer configured to restore the dimension of the selected channel vector, and a basis calculator and channel restorer configured to perform basis inverse transformation with the same sparsifying basis function as that applied in the receiver to restore the channel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The embodiments of the present disclosure describe an apparatus and a method for effectively performing feedback in a multi-antenna system that has a high channel space correlation.

According to an embodiment of the present disclosure, downlink channel information estimated by the terminal is transformed into a sparse domain, and a necessary part thereof is fed back to a transmitter. The transmitter designs a pre-coder, based on the channel information fed from a single user or multiple users, and transmits data using the designed pro-coder. In transforming the channel information into the sparse domain, the terminal uses two-dimensional discrete cosine transformation (DCT) that does not reflect channel features. In addition, the channel selected in part as needed, i.e., the compressed channel may be transmitted to the transmitter in an analog feedback method or in a digital feedback method.

According to another embodiment of the present disclosure, in the case of transformation into the sparse domain, a long-term feature of the channel, that is, principal component transformation (PCT) considering a correlation matrix feature, is used. In addition, the channel selected in part as needed, i.e., the compressed channel may be transmitted to the transmitter in an analog feedback method or in a digital feedback method.

FIGS. 1A, 1B, 1C, and 1D are diagrams comparing space correlations of channels according to an embodiment of the present disclosure.

Figure 1A:
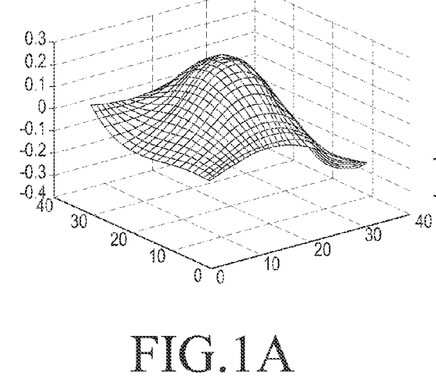
FIGS. 1A, 1B, 1C, and 1D are diagrams comparing space correlations of channels according to an embodiment of the present disclosure.

Referring to FIG. 1A, a three-dimensional graph of channel values in the case of a high space correlation of the channel in the single-user multiple input multiple output (SU-MIMO) system that has 32 transmitter antennas and 32 receiver antennas (e.g., in the case of an array of square antennas which has a narrow gap between antennas) is illustrated.

Figure 1B:
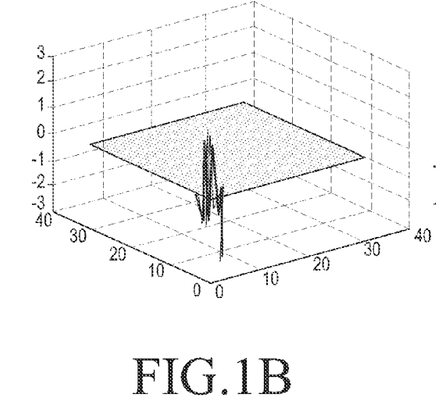

Referring to FIG. 1B, when this is transformed into a sparse domain, channel values are given only at specific positions.

Figure 1C:
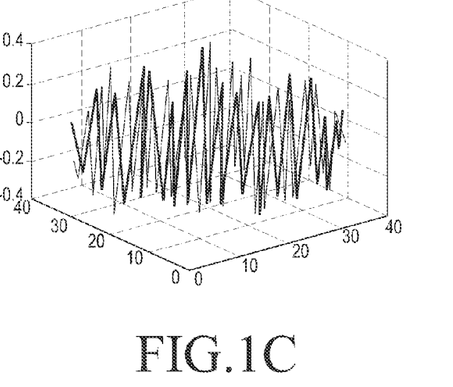

Referring to FIG. 1C, a three-dimensional graph of channel values in the case of a low space correlation of the channel in the same environment (e.g., in the case of an array of linear antennas which has a wide gap between antennas) is illustrated.

Figure 1D:
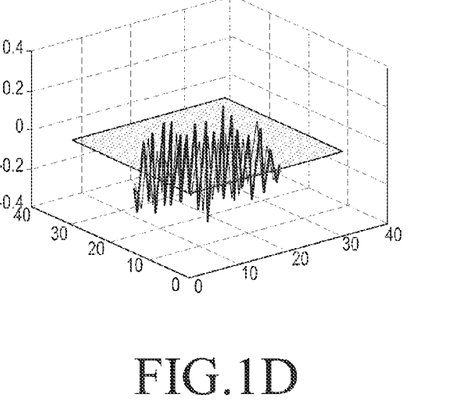

Referring to FIG. 1D, when this is transformed into a sparse domain, channel values are not limited to specific positions. This phenomenon is more noticeable in two-dimensional array antennas is illustrated.

FIGS. 2A, 2B, 2C, 2D, 2E, and 2F are schematic diagrams illustrating a feedback method according to an embodiment of the present disclosure.

Figures 2A, 2B, 2C:
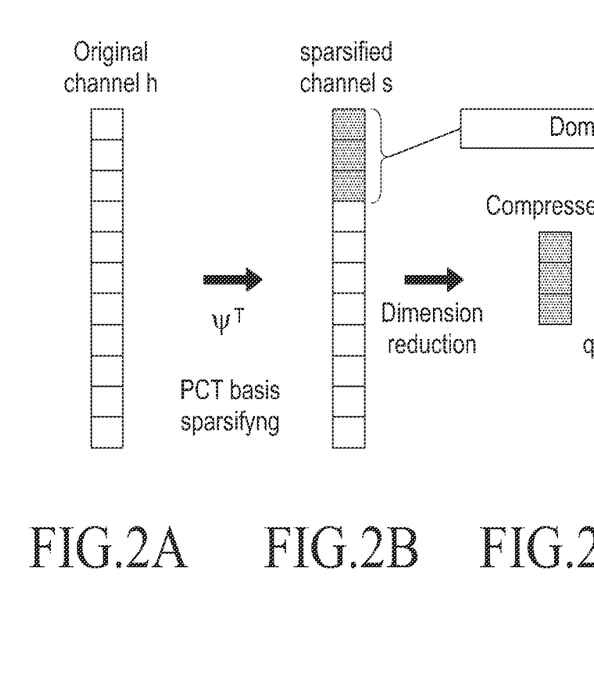
FIGS. 2A, 2B, 2C, 2D, 2E, and 2F are schematic diagrams illustrating a feedback method according to an embodiment of the present disclosure.
Figure 2D:
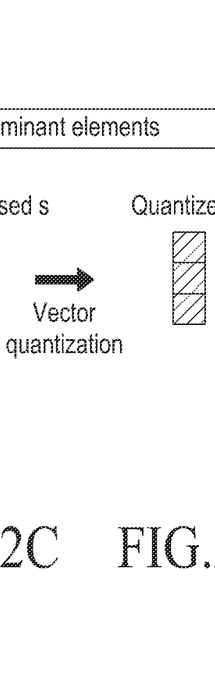

Referring to FIGS. 2A, 2B, 2C, 2D, 2E, and 2F, the receiver vectorizes an estimated channel matrix (see FIG. 2A), and transforms the vectorized channel into a sparse domain by multiplying the vectorized channel by a sparsifying basis function $\Psi$ determined according to the embodiment of the present disclosure to thereby separate dominant elements that contribute to the channel and non-dominant elements that do not contribute to the channel (see FIG. 2B). Elements of the channel "s" transformed into the sparse domain are arranged in descending order from the top. At this time, the dominant elements are selected (reduction of dimension) and encoded to be thereby compressed, considering a channel compression ratio used in the system (see FIG. 2C). In addition, only the compressed part is vector-quantized and a codebook index corresponding thereto is fed back in a digital or an analog method (see FIG. 2D). The vector-quantization is widely used to compress data for limited feedback in wireless communications.

Figure 2E:
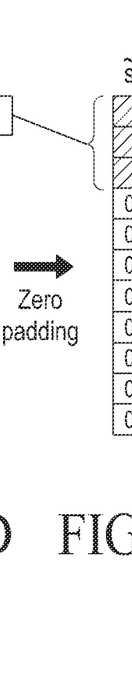
Figure 2F:
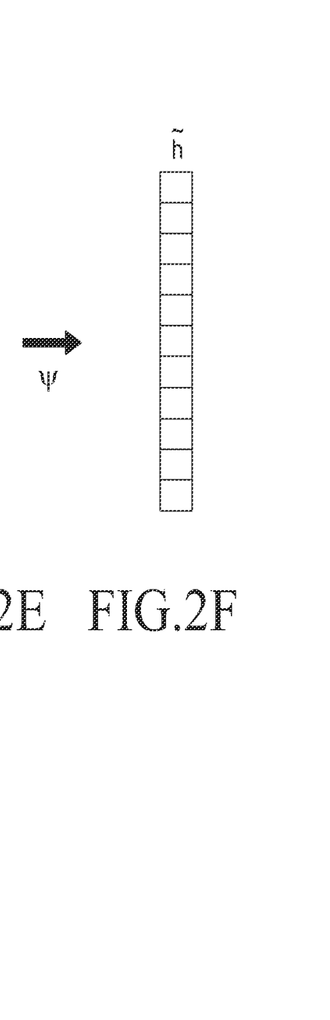

The receiver receives the compressed feedback information, and inserts zero into blank spaces thereof to thereby restore the same to a vector of the same size as that of the original channel vector (see FIG. 2E). In addition, the feedback channel is finally restored by applying the same basis function as that which has been used in the receiver (see FIG. 2F).

FIGS. 3A, 3B, 3C, 3D, 3E, and 3F illustrate transformation into a sparse domain according to an embodiment of the present disclosure.

Figure 3A:
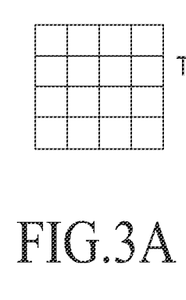
FIGS. 3A, 3B, 3C, 3D, 3E, and 3F illustrate a transformation into a sparse domain according to an embodiment of the present disclosure.
Figure 3B:
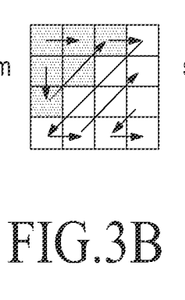
Figure 3C:
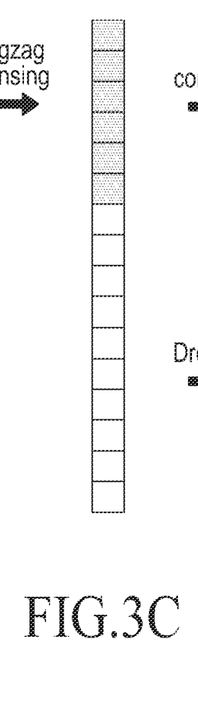
Figure 3D:
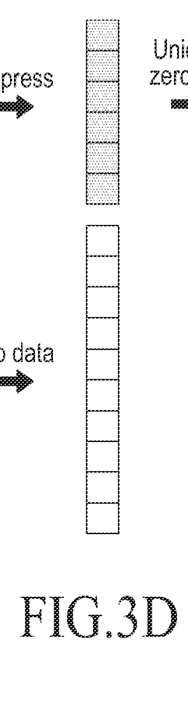
Figure 3E:
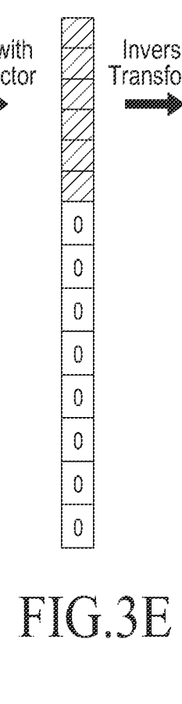
Figure 3F:
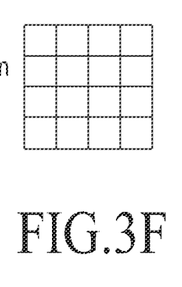

Referring to FIGS. 3A, 3B, 3C, 3D, 3E, and 3F, when the receiver uses a basis transformation method (e.g., two-dimensional DCT) that does not reflect channel features (see FIG. 3A), the elements are selected in a zigzag pattern in order of low frequency (see FIG. 3B). At this time, only dominant elements are selected and compressed to be thereby transmitted to the transmitter (see FIGS. 3C and 3D). The transmitter inserts zero into blank spaces of the compressed feedback information to restore the same to a vector of the same size as that of the original channel vector (see FIG. 3E), and the feedback channel is finally restored through basis inverse transformation thereof (see FIG. 3F). Furthermore, the restored channel is applied to the calculation of beamforming and precoding.

Meanwhile, in the case of using a basis transformation method reflecting channel features (e.g., Karhumen-Loeve transformation (KLT), principal component analysis (PCA), or the like), channel values to be compressed are selected by considering the channel features and then transmitted to the transmitter.

Hereinafter, a method for compressing a channel in consideration of channel features, according to an embodiment of the present disclosure, will be described.

A multiple input multiple output (MIMO) channel matrix that is space-correlated between a receiver having Nr reception antennas and a transmitter having Nt transmission antennas, may be expressed as the following Equation 1.

$$H_k = R_{RX}^{1/2} H_{iid} R_{TX}^{1/2} \qquad \text{Equation 1}$$

$$h = \left((R_{TX}^{1/2})^T \otimes R_{RX}^{1/2}\right) h_{iid}$$

$$\text{Let } R = \left((R_{TX}^{1/2})^T \otimes R_{RX}^{1/2}\right)$$

$$C_h = E[hh^H] = E[R h_{iid} h_{iid}^H R^H] = E[RR^H] = RR^H$$

$$EVD: C_h = \Psi \Lambda \Psi^{-1} = \Psi \Lambda \Psi^H$$

In Equation 1, H denotes a channel matrix of a system, and $R_{RX}$ and $R_{TX}$ denote space correlation matrixes that are created in reception antennas and transmission antennas, respectively. $H_{iid}$ is an Nr*Nt matrix that conforms to the independent and identically distributed complex zero-mean. "h" is a vector value of H, and "$h_{iid}$" is a vector value of $H_{iid}$. Long-term information $C_h$ of a channel is gained based on the entire channel matrix H, and a basis transformation function Ψ can be obtained through Eigen value decomposition (EVD) based on the long-term information. Since $C_h$ is a symmetric matrix, the sparsifying basis function Ψ according to the embodiment of the present disclosure may be calculated through EVD. Here, Ψ is a normalized eigenvector of $C_h$, and Λ is a diagonal matrix in which element values have Eigen values.

Referring to FIG. 2B, a vector value "s" of the channel transformed into the sparse domain may be expressed as $s = \Psi^H h = \Psi^H R h_{iid}$ in which the original channel "h" is applied with the basis transformation function Ψ.

Auto-covariance Cs of "s" may be expressed as the following Equation 2.

$$C_s = E[ss^H] = E[\Psi^H R h_{iid} h_{iid}^H R^H \Psi] = E[\Psi^H RR^H \Psi] = \Lambda \qquad \text{Equation 2}$$

In Equation 2, E[ ] denotes an expectation operator.

Therefore, each entry of "s" is independent from each other, and it conforms to the complex zero-mean Gaussian distribution in which the variance value is an Eigen value of $C_h$. In the case of a high channel correlation, Λ has few dominant elements. Accordingly, the basis function according to an embodiment of the present disclosure can provide excellent sparsifying performance.

In the embodiment of the present disclosure, a codebook is made to be used, considering the Cs value of Equation 2. In the embodiment of the present disclosure, although a method of creating a codebook using the Linde-Buzo-Gray (LBG) algorithm will be described, the present disclosure is not limited thereto, and other algorithms may be used in creating the codebook.

The LBG algorithm is a repetition algorithm using training sets in order to address two optimality criteria (i.e., nearest neighbor condition, and centroid condition). The nearest neighbor condition says that an encoding region is comprised of all vectors that are closer to related codevectors. The centroid condition says that a codevector becomes the average of all training vectors that are in the encoding region. The training set represents the quantized vectors. The LBG algorithm is comprised of a splitting part and an iteration part. The first codevector is calculated as the average of the entire training vectors to satisfy the centroid condition. Afterwards, the splitting algorithm increases the number of codevectors. According to the nearest neighboring condition, a training sequence set in the iteration algorithm is separated as an encoding region related to each codevector. Afterwards, new codevectors are calculated by averaging encoding regions according to the centroid condition. The iteration algorithm is repeated until a squared-error distortion measure coverage of each value converges on each value. Two parts of the algorithm are repeated until the desired number of codevectors is obtained.

In order to create a codebook for the compressed feedback vectors of the sparsified channel "s" according to the embodiment of the present disclosure, a training sequence set is created as a vector set so that each element conforms to the zero-mean Gaussian distribution. The dimension of the created vector is determined according to a certain compression ratio. The zero-mean Gaussian distribution allows variance values of the elements to have Eigen values that are obtained in order of size from Λ of Equation 2.

Figure 4:
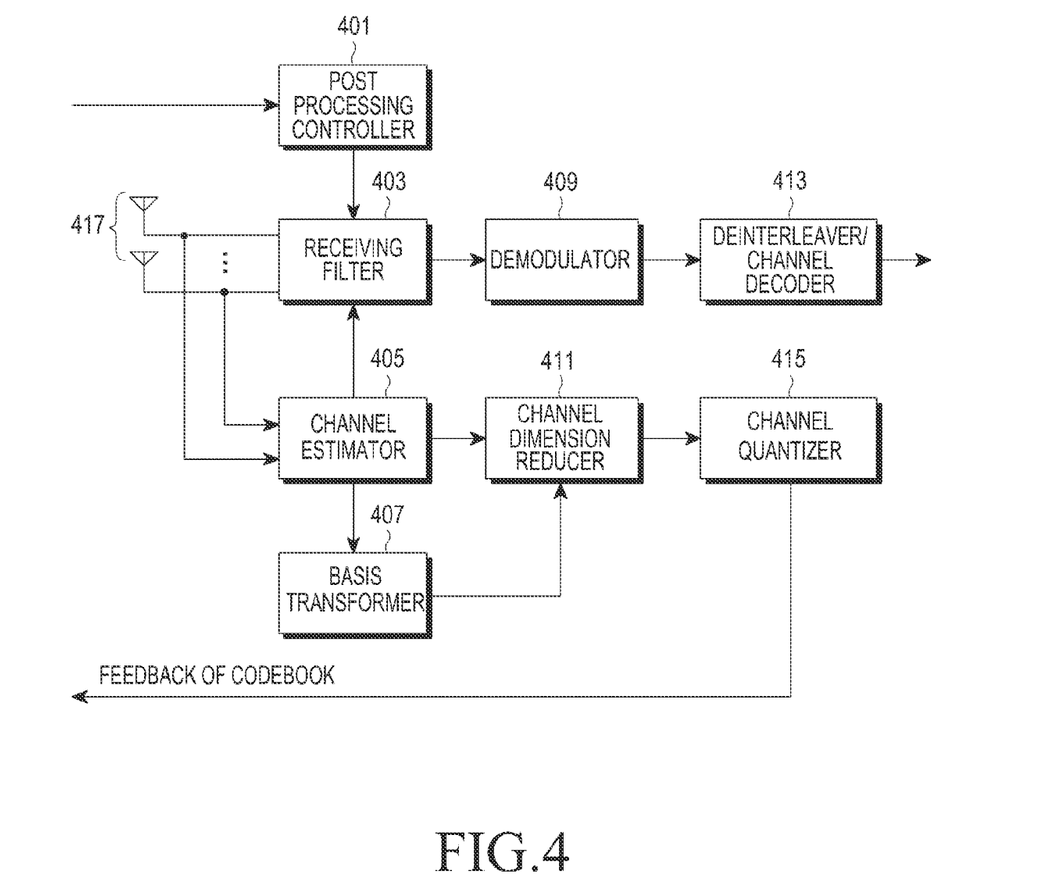
FIG. 4 illustrates a configuration of a receiver for feedback according to an embodiment of the present disclosure.

FIG. 4 illustrates a configuration of a receiver for feedback according to an embodiment of the present disclosure.

Referring to FIG. 4, a receiving channel matrix is configured through a channel estimator 405, based on information received through a plurality of antennas 417, and signals is transformed into a sparse domain by applying a basis function according to the embodiment of the present disclosure in a basis transformer 407. Thereafter, a channel dimension reducer 411 decreases the dimension of the channel according to a channel compression ratio, and a channel quantizer 415 selects a codebook index and feeds the selected codebook index back to the transmitter.

In addition, the information controlled by a post processing controller 401 and the information received through antennas 417 are transferred to a receiving filter 403, and the receiving filter 403 filters signals using channel values that are estimated by the channel estimator 405. The filtered signals is demodulated by a demodulator 409, and then is deinterleaved and decoded by a deinterleaver/channel decoder 413.

Figure 5:
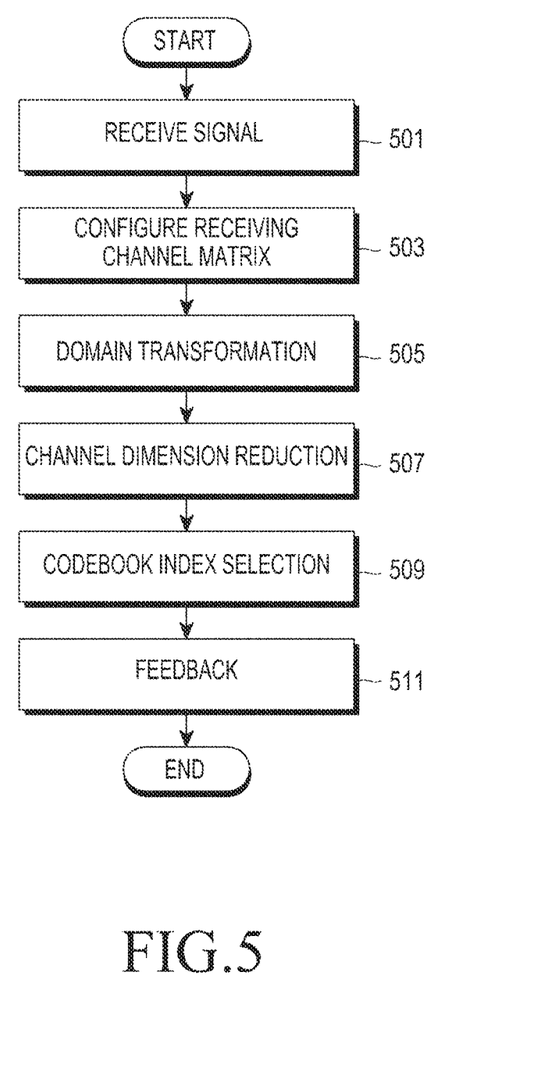
FIG. 5 is a flowchart illustrating a feedback method according to an embodiment of the present disclosure.

FIG. 5 is a flowchart illustrating a feedback method according to an embodiment of the present disclosure.

Referring to FIG. 5, when signals are received through a plurality of antennas at operation 501, a receiving channel matrix is configured by estimating a channel, based on the received information at operation 503. Thereafter, the signals are transformed into a sparse domain by applying a basis function according to the embodiment of the present disclosure to the receiving channel matrix at operation 505. Thereafter, the dimension of the channel is decreased according to a channel compression ratio at operation 507. Furthermore, a codebook index is selected through channel quantization at operation 509, and the selected codebook index is fed back to the transmitter at operation 511.

Figure 6:
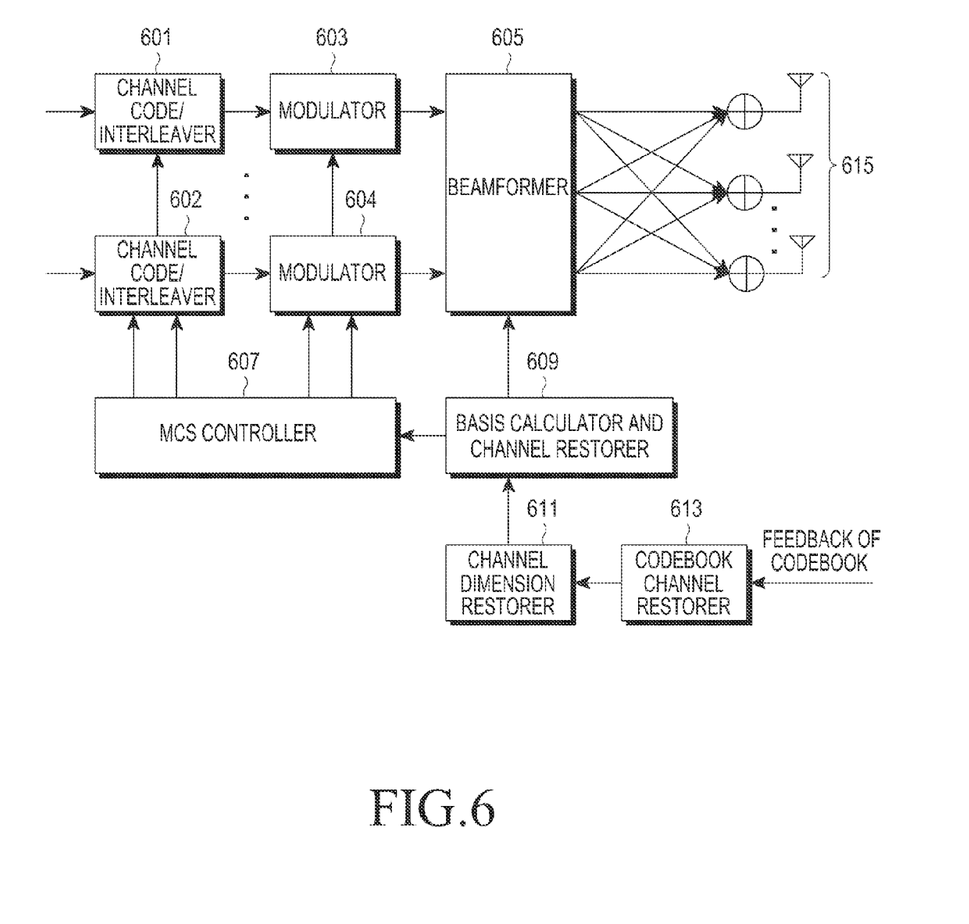
FIG. 6 illustrates a configuration of a transmitter for receiving a feedback signal according to an embodiment of the present disclosure.

FIG. 6 illustrates a configuration of a transmitter for receiving a feedback signal according to an embodiment of the present disclosure.

Referring to FIG. 6, the signals to be transmitted to the receiver are encoded and interleaved by a plurality of channel code/interleavers 601 and 602 under the control of a MCS controller 607, and then are modulated through a plurality of modulators 603 and 604. The modulated signals pass through a beamformer 605 to be thereby transmitted through a plurality of transmission antennas 615.

Meanwhile, according to an embodiment of the present disclosure, when the codebook index is fed back from the receiver, a codebook channel restorer 613 selects a channel vector through a codebook, and a channel dimension restorer 611 restores the channel dimension. Thereafter, a basis calculator and channel restorer 609 performs basis inverse transformation using the same basis function as that of the receiver to thereby restore a channel value. The beamformer 605 performs beamformation, based on the restored channel value.

Figure 7:
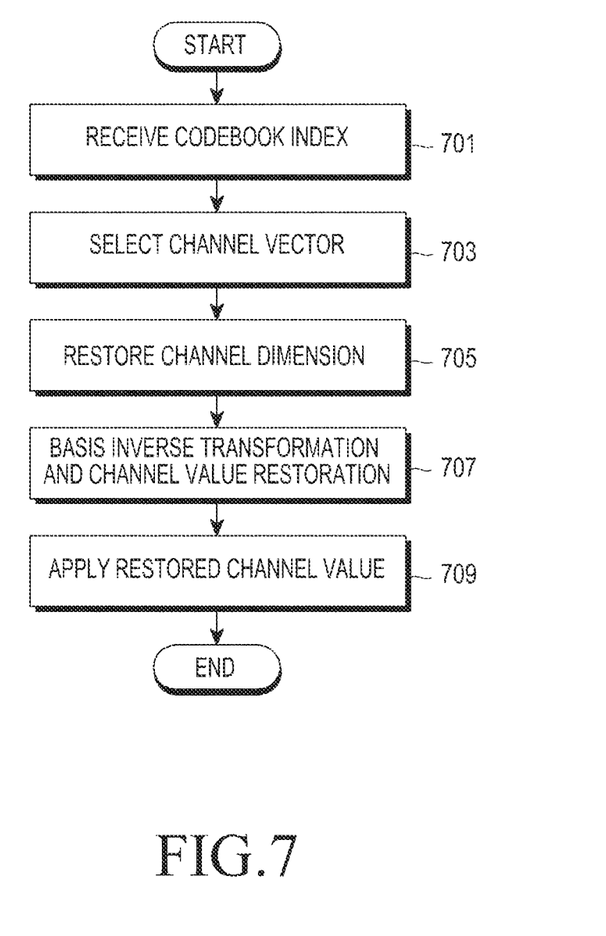
FIG. 7 is a flowchart illustrating an operation of a transmitter for receiving a feedback signal according to an embodiment of the present disclosure.

FIG. 7 is a flowchart illustrating an operation of a transmitter for receiving a feedback signal according to an embodiment of the present disclosure.

Referring to FIG. 7, when the codebook index is fed back from the receiver at operation 701, a channel vector is selected through a codebook at operation 703. Thereafter, the channel dimension of the selected channel vector is restored at operation 705, and then the basis inverse transformation is made using the same basis function as that of the receiver to thereby restore a channel value at operation 707. Afterwards, beamformation is conducted based on the restored channel value at operation 709.

Figure 8:
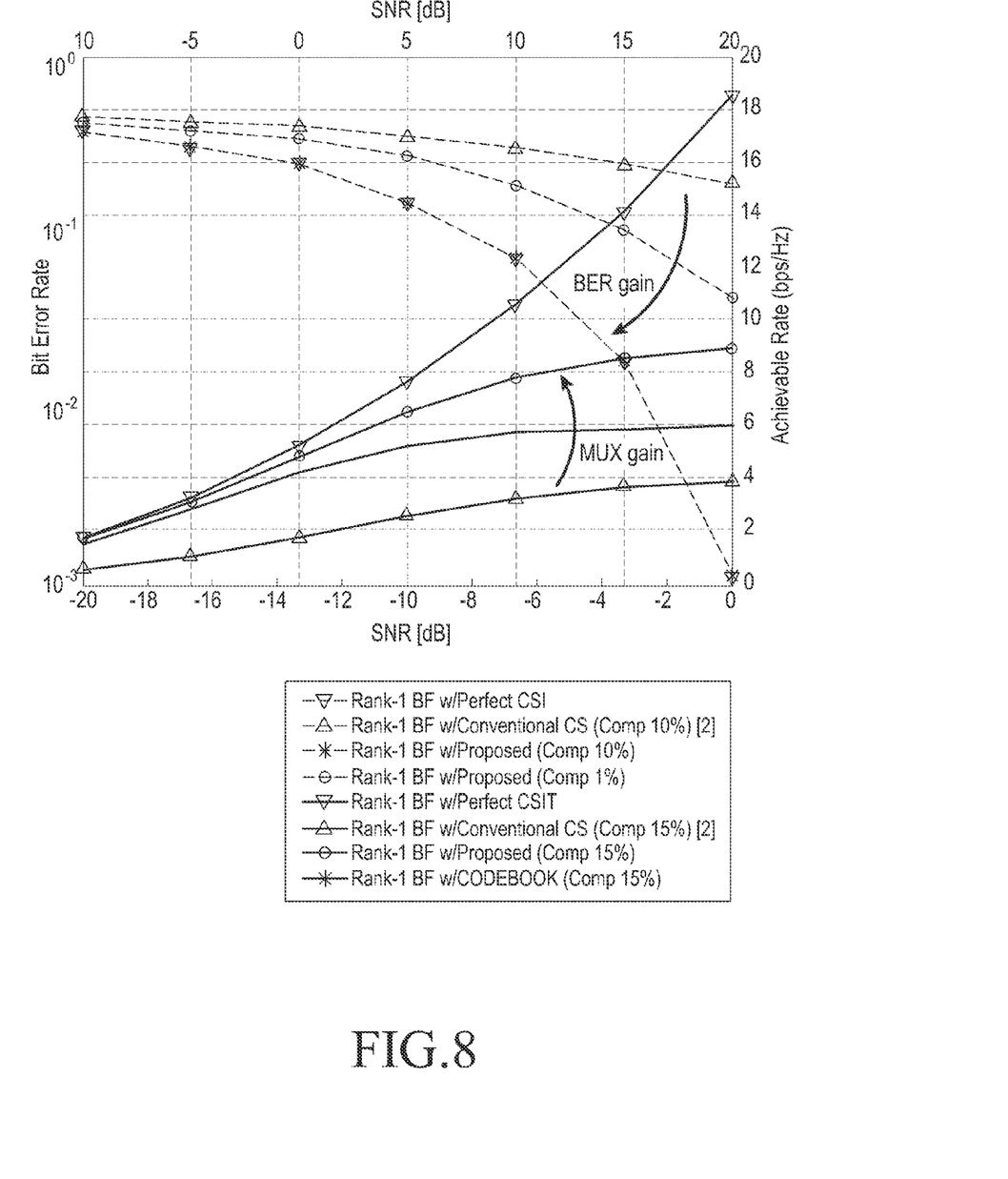
FIG. 8 illustrates a result of simulation in order to verify a performance gain in a feedback method according to an embodiment of the present disclosure.

FIG. 8 illustrates a result of simulation in order to verify a performance gain in a feedback method according to an embodiment of the present disclosure.

FIG. 8 shows that there is little or no difference in performance between a single user massive MIMO system and the embodiment of the present disclosure that has a compression ratio of 10% compared to a reference system having perfect channel information. Furthermore, deterioration in performance is not severe even at a compression ratio of 1%. In addition, in the case of a multiple user massive MIMO system having a compression ratio of 15%, the multiplexing gain of the embodiment of the present disclosure is more than double that of a typical system.

In the MIMO system according to an embodiment of the present disclosure, the apparatus and the method for channel feedback may be carried out in the form of hardware, software, or a combination thereof. Such software may be recorded in an apparatus-readable recording medium, for example, a volatile memory or non-volatile memory, such as a ROM, memories, such as a RAM, a memory chip, a memory device, or an integration circuit, an optical recording medium, such as a CD, or a DVD, or a magnetic recording medium, such as a magnetic tape, regardless of deleting or rewriting data. In the MIMO system according to an embodiment of the present disclosure, the method of channel feedback may be implemented by computers including a controller and a memory, or portable devices, and the memory may be an apparatus-readable recording medium that is suitable for storing programs including instructions for the operation of the embodiment of the present disclosure.

Accordingly, the present disclosure includes programs including codes for executing the apparatus and the method defined in Claims, and an apparatus (computer)-readable recording medium that stores the programs. In addition, the programs may be electrically transferred through a medium, such as signals of wired communications or wireless communications, and the present disclosure includes equivalents thereof.

In addition, in the MIMO system according to an embodiment of the present disclosure, the apparatus for channel feedback may receive and store the programs from program providing devices that are connected in wired communications or wireless communications. The program providing devices may include: programs including instructions that allow the program processing device to execute the channel feedback method in a MIMO system, a memory that stores information necessary for the channel feedback method in the MIMO system, a communication unit that performs wired communication or wireless communication with a graphic processing device, and a controller that transmits a corresponding program to a transmitting/receiving devices automatically or by a request of the graphic processing device.

While the present disclosure has been shown and described with reference to various embodiments thereof, it will be understood by those skilled in the art that various changes in form and details may be made therein without departing from the spirit and scope of the present disclosure as defined by the appended claims and their equivalents thereof.

What is claimed is:

1. A method for feeding a channel back to a transmitter from a receiver in a multiple input multiple output (MIMO) system, the method comprising:
   receiving a signal from the transmitter and configuring a channel matrix for the received signal;
   configuring a basis transformed sparse channel using a sparsifying basis function with respect to the channel matrix, the transformed sparse channel being divided into a dominant part and a non-dominant part;
   selecting a channel part to be fed back to the transmitter from the dominant part of the transformed sparse channel based on a channel compression; and
   creating a codebook by quantizing the selected channel part, and feeding a codebook index corresponding to the created codebook back to the transmitter.

2. The method of claim 1, wherein the sparsifying basis function is obtained by gaining long-term information of the channel, based on the channel matrix, and then by calculation through Eigen value decomposition (EVD), based on the long-term information.

3. The method of claim 1, wherein the codebook is created based on an auto-variance value of the transformed sparse channel.

4. The method of claim 1, further comprising:
   vectorizing, by the receiver, an estimated channel matrix, and
   transforming, by the receiver, the vectorized channel into a sparse domain by multiplying the vectorized channel by a sparsifying basis function to separate dominant elements that contribute to the channel and non-dominant elements that do not contribute to the channel.

5. An apparatus for feeding a channel back to a transmitter in a multiple input multiple output (MIMO) system, the apparatus comprising:
   a channel estimator configured to:
      receive a signal from the transmitter, and
      configure a channel matrix for the received signal;
   a basis transformer configured to configure a basis transformed sparse channel using a sparsifying basis function with respect to the channel matrix, the transformed sparse channel being divided into a dominant part and a non-dominant part;
   a channel dimension reducer configured to select a channel part to be fed back to the transmitter from the dominant part of the transformed sparse channel based on a channel compression; and
   a channel quantizer configured to:
      create a codebook by quantizing the selected channel part, and
      feed a codebook index corresponding to the created codebook back to the transmitter.

6. The apparatus of claim 5, wherein the sparsifying basis function is obtained by gaining long-term information of the channel, based on the channel matrix, and by calculation through Eigen value decomposition (EVD), based on the long-term information.

7. The apparatus of claim 5, wherein the codebook is created based on an auto-variance value of the transformed sparse channel.

8. A method for receiving channel feedback by a transmitter from a receiver in a multiple input multiple output (MIMO) system, the method comprising:
   receiving a codebook index from a receiver;
   selecting a channel vector using the codebook index and a codebook;
   restoring the dimension of the selected channel vector;
   performing basis inverse transformation with the same sparsifying basis function as that applied in the receiver to restore the channel;
   vectorizing, by the receiver, an estimated channel matrix, and
   transforming, by the receiver, the vectorized channel into a sparse domain by multiplying the vectorized channel by a sparsifying basis function to separate dominant elements that contribute to the channel and non-dominant elements that do not contribute to the channel.

9. The method of claim 8, wherein the sparsifying basis function is obtained by gaining long-term information of the channel, based on the channel matrix, and by calculation through Eigen value decomposition (EVD), based on the long-term information.

10. The method of claim 8, wherein, in the restoring of the dimension, the dimension is restored by padding blank spaces of the selected channel vector with zero.

11. The method of claim 8, further comprising performing beamformation using the restored channel.

12. An apparatus for receiving channel feedback from a receiver in a multiple input multiple output (MIMO) system, the apparatus comprising:
   a codebook channel restorer configured to:
      receive a codebook index from a receiver, and
      select a channel vector using the codebook index and a codebook;
   a channel dimension restorer configured to restore the dimension of the selected channel vector; and
   a basis calculator and channel restorer configured to perform basis inverse transformation with the same sparsifying basis function as that applied in the receiver to restore the channel,
   wherein the receiver is configured to:
      vectorize an estimated channel matrix, and
      transform the vectorized channel into a sparse domain by multiplying the vectorized channel by a sparsifying basis function to separate dominant elements that contribute to the channel and non-dominant elements that do not contribute to the channel.

13. The apparatus of claim 12, wherein the sparsifying basis function is obtained by gaining long-term information of the channel, based on the channel matrix, and by calculation through Eigen value decomposition (EVD), based on the long-term information.

14. The apparatus of claim 12, wherein the channel dimension restorer is configured to restore the dimension by padding blank spaces of the selected channel vector with zero.

15. The apparatus of claim 12, further comprising a beamformer configured to perform beamformation using the restored channel.

* * * * *